United States Patent
Friesen

[19]

[11] Patent Number: 6,052,980
[45] Date of Patent: Apr. 25, 2000

[54] EASY CLEAN DUAL WALL DECK FOR ROTARY CUTTER

[75] Inventor: Henry Friesen, Niagara Falls, Canada

[73] Assignee: Deere & Company, Moline, Ill.

[21] Appl. No.: 09/118,591

[22] Filed: Jul. 17, 1998

[51] Int. Cl.$^7$ .......................... A01D 67/00; A01D 75/30
[52] U.S. Cl. ................... 56/320.1; 56/6; 56/16.9
[58] Field of Search .................. 56/16.9, 320.2, 56/320.1, 6, 16.7, 17.5

[56] References Cited

U.S. PATENT DOCUMENTS

| | | | |
|---|---|---|---|
| 4,194,345 | 3/1980 | Pioch et al. | 56/17.5 |
| 4,724,660 | 2/1988 | Bowie et al. | 56/320.1 |
| 4,887,420 | 12/1989 | Cerny, Jr. et al. | 56/320.2 |
| 5,005,344 | 4/1991 | McCracken | 56/16.7 |
| 5,086,614 | 2/1992 | Pestka | 56/17.5 |

OTHER PUBLICATIONS

Brochure Woods Equipment Co., dated 1996—Woods-batwing Models 3240 and 2162.

Primary Examiner—Robert E. Pezzuto
Assistant Examiner—Meredith Petravick

[57] ABSTRACT

A deck for a rotary cutter includes upper and lower deck walls configured together with vertical aprons and wheel support plates at the opposite sides of the deck to form a box structure. Three gear box supports are welded within three pairs of vertically aligned holes respectively provided in the upper and lower deck walls. The upper deck wall is shaped generally convex in fore-and-aft, vertical cross section and is free of ledges formed from framework of stringers so that debris tends to fall off and water tends to run off the deck.

10 Claims, 3 Drawing Sheets

6,052,980

EASY CLEAN DUAL WALL DECK FOR ROTARY CUTTER

Assignment

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

BACKGROUND OF THE INVENTION

The present invention relates to rotary cutters and more specifically relates to decks for such cutters.

During cutting/shredding of material, such as cotton corn, milo and wheat stubble, grass, etc. with a rotary cutter, debris accumulates on the top of the cutter deck. If not regularly cleaned off, the debris retains moisture which eventually results in the deck rusting out. With current style decks, the structural components such as outboard stringers, gearbox saddles, plates and gussets make it difficult to clean the deck and create traps for material and/or water to accumulate. While it is known to provide decks which have a relatively smooth upper surface that can be cleaned of debris quite easily and efficiently, these decks have been made with structural components on their undersides which interfere with the smooth flow of cut material thus making operation somewhat inefficient and thereby increasing the amount of power required to do the cutting operation.

SUMMARY OF THE INVENTION

According to the present invention, there is provided an improved deck for a rotary cutter.

An object of the invention is to provide a deck which is easy to clean but yet has an underside free of obstructions to the smooth flow of cut material.

A more specific object of the invention is to provide a rotary cutter deck which has an upper, generally convex smooth surface from which debris tends to slide off and water will run off.

Still another object is to provide a rotary cutter deck which is constructed of upper and lower walls, the upper wall defining an upper, somewhat convex smooth surface and the lower wall being horizontal and having an underside free of structural members, except for the usual material flow baffles, allowing for smooth material flow.

Another object of the invention is to provide a rotary cutter deck which is constructed of upper and lower walls joined together in such a way as to allow the upper wall to be bowed or formed in the weld fixture so as to have a convex surface thus eliminating any pre-bending prior to being placed in the weld fixtures.

Yet another object of the invention is to provide a deck defined by upper and lower walls which are joined together to create a central box structure having good torsional strength and wherein the thicknesses of one or the other or both of the deck walls can be altered for flexibility in the design requiring no changes in the laser programs for cutting the pieces from which the deck sections are constructed nor changes in the punch tooling or weld fixtures.

DESCRIPTION OF THE PREFERRED EMBODIMENT

Figure 1:
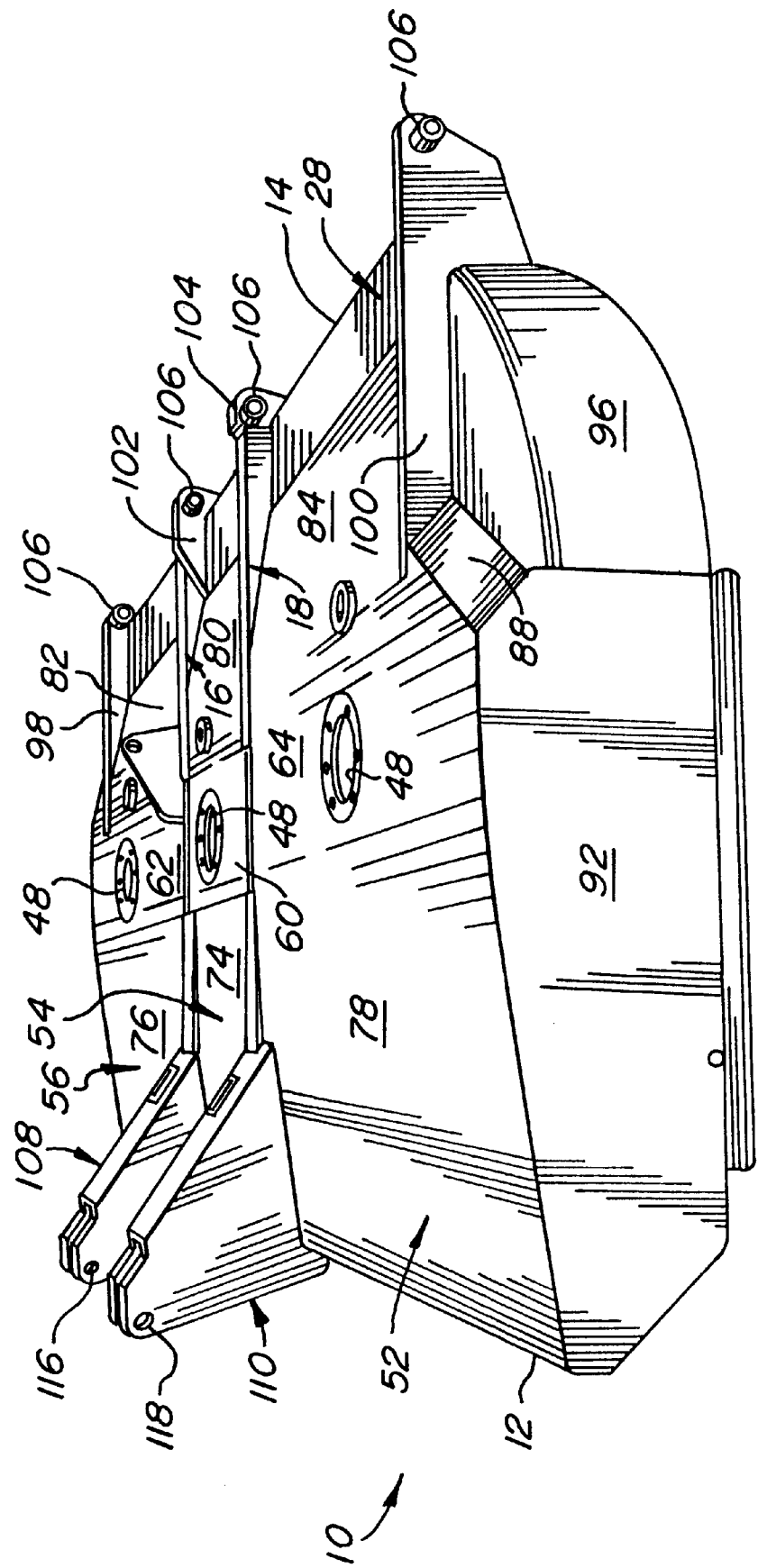
FIG. 1 is a left end perspective view of the rotary cutter deck constructed in accordance with the present invention.
Figure 2:
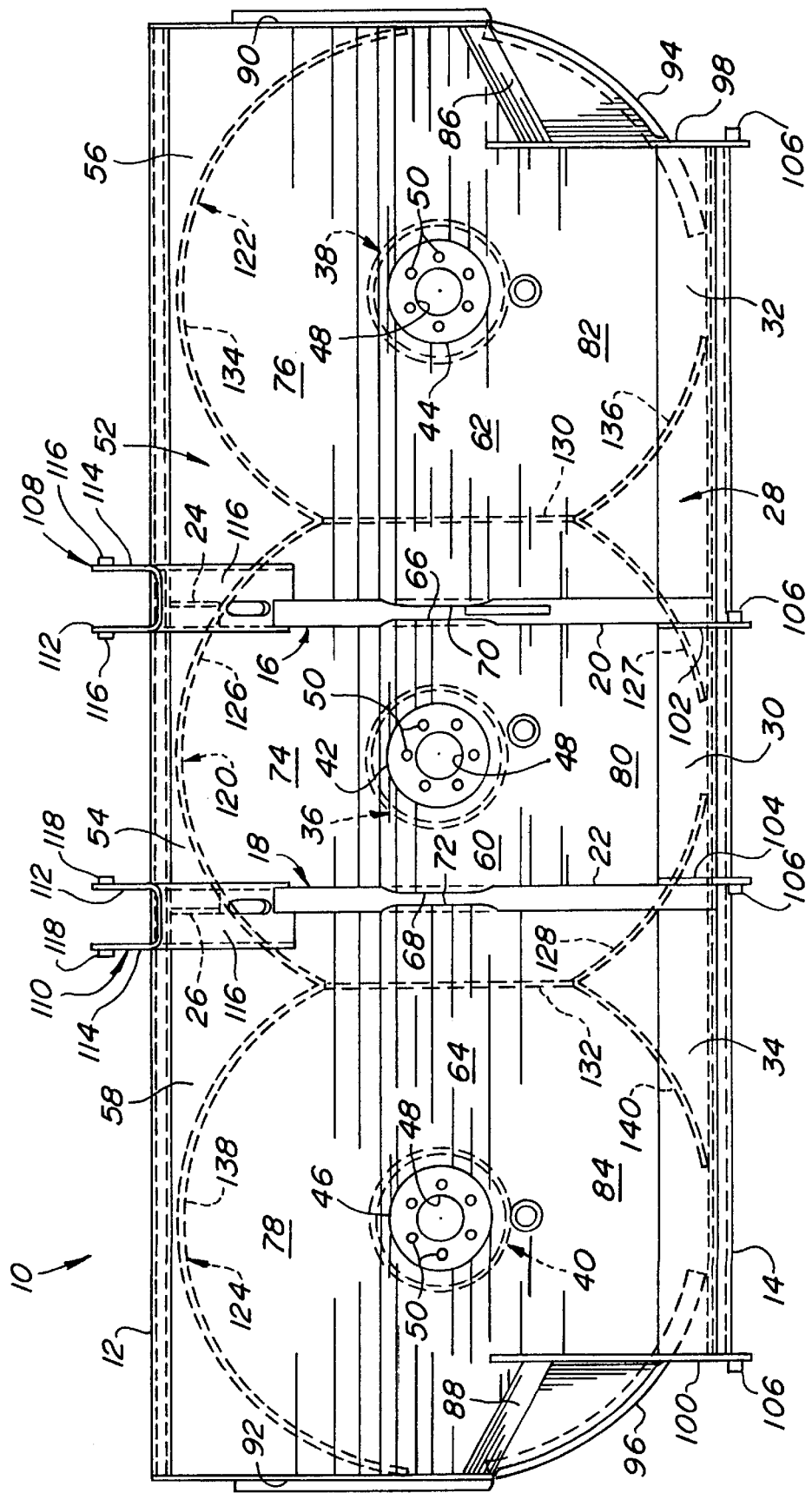
FIG. 2 is a top plan view of the cutter deck shown in FIG. 1.
Figure 3:
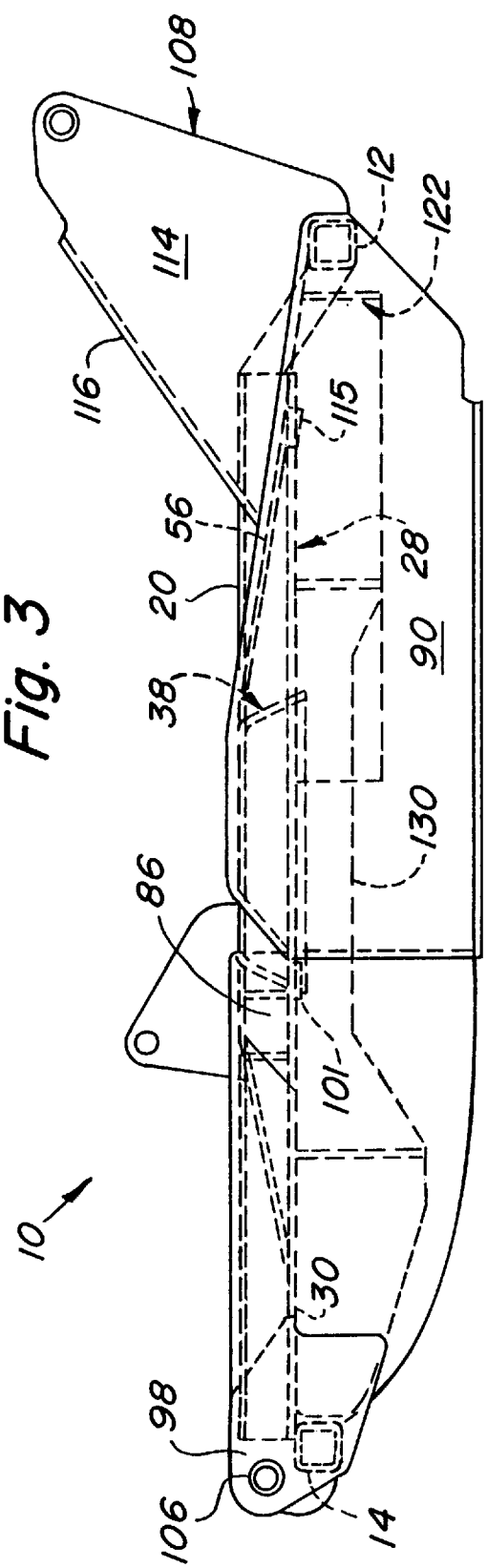
FIG. 3 is a right side elevational view of the cutter deck shown in FIG. 2.

Referring now to the drawings, there is shown a rotary cutter deck 10 designed for supporting three mower spindles in a side-by-side arrangement. The deck 10 is a weldment featuring a stiffening framework comprising front and rear tubular cross members 12 and 14, respectively, and interior, transversely spaced tubular, fore-and-aft extending, right- and left-hand stringers 16 and 18, respectively. The majority of the length of the stringers 16 and 18 is defined by respective horizontal portions 20 and 22 having rear ends which overlap and are welded to the upper forward corner of the rear cross member 14, the stringer portions 20 and 22 terminating at and being joined to downwardly inclined forward end portions 24 and 26 having forward ends engaged with, and welded to, the backside of the front cross member 12.

A horizontally disposed, lower deck wall 28 includes a rectangular middle section 30, and right- and left-hand sections 32 and 34, respectively. Outer edges of the lower middle wall section 30 and inner edges respectively of the lower right- and left-hand wall sections 32 and 34 extend beneath and are welded to the stringers 16 and 18. The wall sections 30, 32 and 34 have respective rear edges welded to the upper front corner of the rear cross member 14. Provided in the middle of each of the lower wall sections 30, 32 and 34 are circular openings respectively receiving identical gear box supports 36, 38 and 40, these supports each being in the form of an inverted bowl inserted upwardly through a respective opening and being welded in place. The supports 36, 38 and 40 have horizontal circular tops 42, 44 and 46, respectively, with each top being provided with a central hole 48 about which is provided a circular pattern of gear box mounting holes 50.

An upper deck wall 52 includes a middle section 54, which is substantially rectangular in top view, and right- and left-hand sections 56 and 58, respectively. The upper wall sections 54, 56 and 58 include respective areas 60, 62 and 64, which are convexly bowed from front to rear and provided with circular openings beneath which the tops of the gear box supports 36, 38 and 40 are located, with respective perimeters of the supports supporting and being welded to the upper deck wall sections 54, 56 and 58. Opposite outer side projections 66 and 68 of the upper deck wall middle section 54 extend above and are welded to upper inner corner locations of the stringers 16 and 18, while inner side projections 70 and 72, respectively of the right- and left-hand upper deck wall convex areas 62 and 64 are located above and welded to upper outer corner locations of the stringers 16 and 18. Thus, the upper deck wall 52, as a whole, is generally convex shaped as viewed in vertical cross section taken fore-and-aft through the centers of the holes 48, this shape being due to the fact that the middle, and right- and left-hand upper deck wall sections 54, 56 and 58 respectively include similarly sloped front portions 74, 76 and 78 which are inclined downwardly and forwardly from the convex areas 60, 62, and 64 to the front cross tube 12. Similarly, sloped downwardly and rearwardly, at the same inclination, from the convex areas 60, 62 and 64 to the lower deck wall 28 are respective rear portions 80, 82 and 84, with rear edges of these portions being welded to the lower deck wall 28. Outer rear portions of the right- and left-hand upper deck wall sections 56 and 58 are connected to the right- and left-hand lower deck wall portions by respective downwardly and rearwardly inclined filler plates 86 and 88.

Forming opposite ends of the cutter deck 10 are vertical, front side apron sections 90 and 92, in the form of plates which extend fore-and-aft between and are welded to respective outer ends of the front cross tube 12 and respective outer ends of the filler plates 86 and 88. Rear, right- and left-hand side apron sections 94 and 96, respectively, are curved arcuately about the gear box supports 38 and 40 and have respective forward ends welded to rear ends of the front side apron sections 90 and 92. Opposite ends of the transverse rear tube 14 respectively terminate in approximately the same vertical, fore-and-aft extending planes as do respective inner ends of the filler plates 86 and 88 and, extending fore-and-aft between and being welded to outer ends of the tube 14 and inner ends of the filler plates 86 and 88 are respective outer, vertical wheel assembly support plates 98 and 100, the latter also being welded to outer edges of the downward and rearward sloped portions 82 and 84. The support plates 98 and 100 have lower edges which extend downwardly along and are welded to the rear apron sections 94 and 96. In addition, the lower edge of each of the support plates 98 and 100 includes a tab 101 adjacent the forward ends of the plates, the tabs being received in and welded at slots provided in the lower deck wall 28. Mounted in axial alignment with each other at the rear ends of each of the support plates 98 and 100 and in the rear end of each of a pair of interior support plates 102 and 104 is a bushing 106, it being noted that the plates 102 and 104 are respectively welded to the sides of the stringers 16 and 18 and have lower edges extending over and being welded to top and rear sides of the rear cross tube 14.

The deck 10 further includes right- and left-hand hitch supports 108 and 110, respectively, in the form of channel members each having substantially triangular, inner and outer sides 112 and 114 joined along one of their respective edges by a web 116. The inner sides 112 are welded to inside surfaces of forward end portions of the stringers 16 and 18, and have lower edges welded to the middle upper deck wall section 74, while the outer sides 114 have lower edges welded to the right- and left-hand outer upper deck wall sections 76 and 78 and have respective tabs 115 that project downwardly through, and welded in, slots provided in the right- and left-hand lower deck wall sections 32 and 34, respectively. Axially aligned hitch structure mounting holes 116 and 118 are respectively provided in the supports 108 and 110.

The horizontal lower deck wall 28 presents an uninterrupted surface for permitting the free flow of cut material, however, provided for guiding the cut material are center, and right- and left-hand baffle assemblies 120, 122 and 124, respectively, welded to and depending from the lower deck wall 28 and forward portion of the upper deck wall 52. Specifically, the center baffle assembly 120 includes a center front baffle section 126, and right- and left-hand rear baffle sections 127 and 128 arranged arcuately about the center gear box support 36, with opposite ends of the front baffle section 126 terminating at and being welded to forward ends of right- and left-hand, fore-and-aft extending baffle sections 130 and 132, respectively. Front and rear ends of the right-hand rear baffle section 127 respectively terminate at and are welded to the rear end of the baffle section 130 and to the front side of the cross member 14, while front and rear ends of the left-hand rear baffle section 128 respectively terminate at and are welded to the rear end of the baffle section 132 and the front side of the cross member 14. It is to be noted that the cutter blades would sweep overlapping paths that extend below lower edges of the baffle sections 130 and 132.

The right-hand baffle assembly 122 includes a front baffle section 134 having its left-hand end joined to the forward end of the right-hand baffle section 130, and having its right-hand end joined to the right-hand front side apron section 90 at a location just forwardly of the right-hand rear side apron section 94. A rear baffle section 136 has a left-hand end welded to the rear end of the baffle section 130 and a right-hand end terminating at and being welded to the rear cross member 14 at a location adjacent a left-hand end of the apron section 94. Similar to the right-hand baffle assembly 122, the left-hand baffle assembly 124 includes a front baffle section 138 having its right-hand end joined to the front of the left-hand baffle section 132, and having a left- hand end joined to the left-hand front side apron section 92 at a location just forwardly of the left-hand rear side apron section 96. The baffle assembly 124 also includes a rear baffle section 140 having its right-hand end welded to the rear end of the baffle section 132 and its left-hand end welded to the rear cross member 14 at a location spaced inwardly from the rear end of the left-hand rear side apron section 96.

It will be appreciated that the upper and lower deck walls 28 and 52 cooperate with each other, the filler plates 86 and 88, the apron sections 90 and 92 and the wheel assembly support plates 98 and 100 to form a box section having torsional rigidity. Further, it will be appreciated that the deck 10 can be made medium or heavy duty by merely altering the thickness of the material from which the lower and/or upper deck walls 28 and 52, respectively, are made, these simple changes allowing for flexibility in the design requiring no changes in laser programs, punch tooling or weld fixtures.

While the disclosed deck 10 is designed for using three spindles, single spindle, multi-spindle rigid and flex-wing cutters can also be made using the dual deck wall design concept.

What is claimed is:

1. A rotary cutter deck comprising: a lower, substantially planar, horizontal deck wall; an upper deck wall including a central portion elevated above said lower deck wall, and front and rear portions respectively sloped downwardly and forwardly, and downwardly and rearwardly from said central portion into engagement with, and being secured to, said lower deck wall; and right- and left-hand end wall structures respectively being joined to right- and left-hand ends of said lower and upper deck walls to thereby define a box section having torsional stiffness.

2. The rotary cutter deck defined in claim 1 wherein said right- and left-hand end wall structure include right- and left-hand, fore-and-aft extending apron members.

3. The rotary cutter deck defined in claim 1 and further including a framework including front and rear transversely extending cross tubes; said upper deck wall having a front edge welded to said front cross tube; and said lower deck wall having a rear edge welded to said rear cross tube.

4. The rotary cutter deck defined in claim 3 wherein said framework further includes a pair of transversely spaced stringers, each extending fore-and-aft between and having opposite ends fixed to said front and rear cross tubes; and said lower deck wall being secured to an underside of said stringers.

5. The rotary cutter deck defined in claim 4 and further including first and second hitch assembly supports fixed to a forward side of said deck and respectively being secured to said pair of transversely spaced stringers.

6. The rotary cutter deck defined in claim 1 wherein said lower and upper deck walls cooperate to present an upwardly facing deck surface which is smooth and substantially obstruction free from front to back, whereby material may slide or easily be washed off said deck surface, and water will run off said deck surface.

7. The rotary cutter deck defined in claim 1 wherein at least one cutter drive gear box support extends between and is welded to said lower deck wall and the central portion of said upper deck wall.

8. The rotary deck defined in claim 4 wherein said upper deck wall includes central and right- and left-hand sections which cooperate to define said central and front and rear portions; said central section having right- and left-hand edges respectively fixed to inner surfaces of said pair of transversely spaced stringers, and said right- and left-hand sections respectively having inner edges fixed to outer surfaces of said pair of transversely spaced stringers; and said central portion being at a level commensurate with a top surface of each of said pair of transversely spaced stringers.

9. The rotary cutter deck defined in claim 1 wherein middle, right-hand and left-hand sets of upper and lower, axially aligned circular gear box support openings are respectively provided at transversely spaced locations in said central portion of said upper deck wall and in said lower deck wall, with said lower circular gear box support openings being larger in diameter than said upper circular gear box support openings; a gear box support associated with each set of upper and lower circular openings and defined by a side wall, in the form of a truncated cone having its small end up and closed by a top wall, with the side wall of the gear box support being located in the lower circular opening and there being welded to the lower deck wall, and with the top wall being disposed within the upper circular opening and there being welded to said upper deck wall, whereby said box section is strengthened by said gear box supports.

10. A rotary cutter deck comprising: a horizontal, substantially planar, lower deck wall having first parallel front and rear, transversely extending edges; an upper deck wall which, as viewed from the side, is bowed upwardly between second parallel front and rear, transversely extending edges; said upper deck wall engaging, being welded to and having its rear edge located downwardly and forwardly beyond said front edge of said lower deck wall; said rear edge of said upper deck wall engaging and being welded to said lower deck wall at a location spaced forwardly of the rear edge of said lower deck wall; and right- and left-hand end wall structures being joined to right-hand left-hand side edges of each of said upper and lower deck walls thereby forming a box section having torsional stiffness.

* * * * *